United States Patent [19]
Byrd et al.

[11] 4,429,634
[45] Feb. 7, 1984

[54] ADHESIVE LINER FOR CASE BONDED SOLID PROPELLANT

[75] Inventors: James D. Byrd; James O. Hightower, both of Huntsville, Ala.

[73] Assignee: Thiokol Corporation, Chicago, Ill.

[21] Appl. No.: 129,542

[22] Filed: Mar. 12, 1980

Related U.S. Application Data

[63] Continuation of Ser. No. 888,058, Mar. 20, 1978, abandoned, which is a continuation of Ser. No. 757,260, Jan. 6, 1977, abandoned.

[51] Int. Cl.³ .................................................. F42B 1/00
[52] U.S. Cl. ................................... 102/290; 149/19.9; 264/3 R
[58] Field of Search ....................... 264/3 R; 102/290; 149/19.4, 19.9

[56] References Cited

U.S. PATENT DOCUMENTS

| | | | |
|---|---|---|---|
| 3,046,829 | 7/1962 | Roemer | 149/19.9 |
| 3,883,375 | 5/1975 | Mastrolia et al. | 149/19.9 |
| 3,904,715 | 9/1975 | Sieg et al. | 102/290 |
| 3,943,208 | 3/1976 | Ratte et al. | 102/290 |
| 3,974,004 | 8/1976 | Cucksee et al. | 149/19.9 |
| 4,019,933 | 4/1977 | Cucksee et al. | 149/19.4 |
| 4,053,680 | 10/1977 | Wasserman et al. | 102/290 |

*Primary Examiner*—Edward A. Miller
*Attorney, Agent, or Firm*—Gerald K. White

[57] ABSTRACT

Bonding of hydroxy terminated polybutadiene based propellant grains to rocket motor liners and of the liner to the motor case is greatly improved by incorporating an aziridine in a urethane cured hydroxy terminated polybutadiene based liner.

4 Claims, No Drawings

ADHESIVE LINER FOR CASE BONDED SOLID PROPELLANT

The Government has rights in this invention pursuant to Contract No. J243229D, awarded by the Department of the Army to Thiokol Corporation.

This is a continuation of application Ser. No. 888,058, filed Mar. 20, 1978, which in turn is a continuation of application Ser. No. 757,260, filed Jan. 6, 1977, both now abandoned.

BACKGROUND OF THE INVENTION

In general, case bonded solid propellant grains possess greater strength because of the additional support given by their adherence to the rocket motor casing in which they are contained. To insure the maximum strength and to prevent separation of the propellant grain from the motor walls which would create voids and therefore a potential for uneven burning, it is desirable that the propellant grain be bonded to the motor casing uniformly and firmly.

This is usually accomplished by very careful cleaning and descaling of the inside surface of the metal motor casing, followed by coating the inside surface with a liner, normally the binder used for the propellant grain, then casting the propellant grain in place and curing. The liner serves as a bonding agent between the casing and the propellant grain, as an inhibitor preventing burning down the outer surface of the grain and as an insulator, protecting the casing from the heat and gases of combustion when burning has progressed to the point at which the casing would otherwise be exposed.

The present invention relates to case liners containing aziridine compounds, methods for their formulation and use. The liners are formulated from hydroxy terminated polybutadiene based polyurethane binders.

U.S. Pat. No. 3,974,131, issued Aug. 10, 1976, is related to the use of various acrylated aziridinyl monomers and polymers and their use as adhesive promoters in vinyl formulations. The compounds contemplated for use in this invention are intended for use in enhancing the adhesiveness of polyurethanes.

SUMMARY OF THE INVENTION

The invention provides a composition of matter which comprises a liquid hydroxy terminated polybutadiene and an aziridine.

The tangible embodiments of this composition aspect of the invention possess the inherent applied use characteristic of being curable with diisocyanate curing agents to produce solids which are suitable for use as casing liners in case bonded solid fuel rocket motors.

Particularly preferred embodiments of this composition aspect of the invention are those wherein the aziridine is selected from:
Trimesoyl-1-(2-ethyl-aziridine),
Bis-isophthaloyl-1-(2-methyl)-aziridine,
Bis-isosebacoyl-1-(2-ethyl)-aziridine,
Bis-isosebacoyl-1-aziridine,
Tri-[-1-(2-methyl)-aziridinyl]-Phosphine oxide,
Bis-[1-(2-methyl)-aziridinyl]-ethyl sulfone, or
polyfunctional aziridines PFAZ300 or PFAZ301-supplied by Ionac Chemical Company, Birmingham, N.J.

The invention also provides a process for case bonding a hydroxy terminated polybutadiene based polyurethane bound solid propellant grain to a rocket motor casing which comprises:

(a) lining a rocket motor casing to which it is desired to case bond said propellant grain with a cured liner comprising an aziridine and a hydroxy terminated polybutadiene cured with a polyisocyanate curing agent and;

(b) casting said hydroxy terminated polybutadiene based propellant grain in an uncured form in the desired configuration into said lined rocket motor; and (c) curing said propellant grain.

The invention also provides an improved case bonded solid propellant rocket motor containing a hydroxy terminated polybutadiene based polyurethane bound propellant grain wherein the improvement comprises the incorporation of an aziridine into the casing liner of said rocket motor.

DESCRIPTION OF THE PREFERRED EMBODIMENTS

The practice of the invention will now be illustrated with reference to a specific embodiment thereof, namely a rocket motor casing liner comprising the hydroxy terminated polybutadiene based polyurethane binder having the trade designation R-45M and the aziridine, trimesoyl-1-(2-ethyl)-aziridine.

The hydroxy terminated polybutadiene polymer R-45M is sold by Arco Chemical Company and its structure may be represented as:

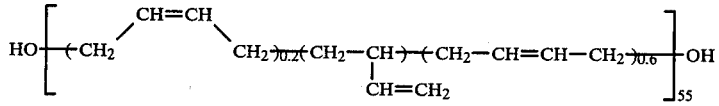

The R-45M is blended with the trimesoyl-1-(2-ethyl)-aziridine, a conventional diisocyanate curing agent, conveniently DDI, a $C_{36}$ liquid aliphatic diisocyanate sold by General Mills, and, if desired, one or more fillers such as carbon black. The blended composition is vacuum degassed and cast as a liner into a previously descaled and degreased steel rocket motor casing and cured at elevated temperature from about 145° F. to about 200° F. After cure or partial cure is complete a hydroxy terminated polybutadiene based propellant grain, such as, for example, a propellant consisting of R-45M as a binder ranging from 8½ to about 24% by weight and including such conventional compounding ingredients as dioctyl adipate as a plasticizer, a polyisocyanate curing agent such as isophorone diisocyanate or the above mentioned DDI up to about 2% by weight, an oxidizer such as, ammonium perchlorate up to 75 to 90% by weight, if desired, a portion of metallic fuel such as aluminum metal, and other conventional combustion stabilizers, flame coolants and the like may be cast and cured in place in the lined motor in conventional fashion.

In addition to the R-45M binder specifically illustrated herein, it will be obvious to one skilled in the art that any liquid hydroxy terminated polybutadiene polymer known to be useful for propellant grain binding will be applicable in the invention. Illustrative of these polymers are, for example, those sold under the trade designations R-45HT, R-15M, CS-15, by Arco Chemical Company, and Butarez HTS by Philips Petroleum Company. It will similarly be evident to one skilled in the art that in addition to the DDI illustrated herein any polyisocyanate may be used to effect cure of the binder. Illustrative of other suitable polyisocyanates are, for example, isophorone diisocyanate, hexamethylene diisocyanate, PAPI polymeric diisocyanates sold by the Upjohn Company and Desmodure N-100 a polyisocyanate sold by I. G. Farben Industries, and also such isocyanates as: 1-methoxyphenyl-2,4-diisocyanate, 1-methyl-4-methoxyphenyl-2,5-diisocyanate, 1-ethoxyphenyl-2,4-diisocyanate, 1,3-dimethoxyphenyl-4,6-diisocyanate, 1,4-dimethoxyphenyl-2,5-diisocyanate, 1-propoxyphenyl-2,4-diisocyanate, 1-isobutoxy-2,4-diisocyanate, 1,4-diethoxyphenyl-2,5-diisocyanate, toluene-2,4-diisocyanate, toluene-2,6-diisocyanate, diphenylether-2,4-diisocyanate, naphthalene-1,4-diisocyanate, 1,1'-dinaphthalene-2,2'-diisocyanate, biphenyl-2,4-diisocyanate, 3,3'-dimethylbiphenyl-4,4'-diisocyanate, 3,3'-dimethoxybiphenyl-4,4'-diisocyanate, diphenylmethane-4,4'-diisocyanate, diphenylmethane-2,4'-diisocyanate, diphenylmethane-2,2'-diisocyanate, 3,3'-dimethoxy diphenylmethane-4,4'-diisocyanate, benzophenone-3,3'-diisocyanate, ethylene diisocyanate, propylene diisocyanate, butylene diisocyanate, pentylene diisocyanate, methylbutylene diisocyanate, tetramethylene diisocyanate, pentamethylene diisocyanate, dipropyl diisocyanate ether, heptamethylene diisocyanate, 2,2-dimethylpentylene diisocyanate, 3-methoxy-hexamethylene diisocyanate, octamethylene diisocyanate, 2,2,4-trimethylpentylene diisocyanate, 3-butoxyhexamethylene diisocyanate, 1,3-dimethylbenzene diisocyanate, 1,4-dimethyl benzene diisocyanate, 1,2-dimethylcyclohexane diisocyanate, 1,4-dimethylcyclohexane diisocyanate, 1,4-dimethylbenzene diisocyanate, 1,4-dimethylnaphthalene diisocyanate, 1,5-dimethylnaphthalene diisocyanate, cyclohexane-1,3-diisocyanate, cyclohexane-1,4-diisocyanate, 1-methylcyclohexane-2,4-diisocyanate, 1-methylcyclohexane, -2,2-diisocyanate, 1-ethylcyclohexane-2,4-diisocyanate, dicyclohexylmethane-4,4'-diisocyanate, dicyclohexylmethylmethane-4,4-diisocyanate, dicyclohexyldimethylmethane-4,4'-diisocyanate, 2,2-dimethyldicyclohexylmethane-4,4'-diisocyanate, 3,3',5,5'-tetramethyldicyclohexylmethane-4,4'-diisocyanate, 4,4'-methylenebis (cyclohexylisocyanate), ethylidene diisocyanate, 4,4'-diphenyl diisocyanate, dianisidine diisocyanate, 1,5-naphthalene diisocyanate, m-phenylene diisocyanate, isopropylidene bis (phenyl or cyclohexyl isocyanate), 1,3-cyclopentylene diisocyanate, 1,2-cyclohexylene diisocyanate, 1,4-cyclohexylene diisocyanate, 4,4',4''-triphenylmethane triisocyanate, 1,3,5-triisocyanate benzene, phenylethylene diisocyanate, and the like.

It will also be apparent to one skilled in the art that in addition to trimesoyl-1-(2-ethyl) aziridine illustrated herein other aziridines will be full equivalents for the purposes of this invention. Illustrative of these are, for example, tris-2,4,6-(1-aziridinyl)-1,3,5-triazine, bis-isophthaloyl-1-(2-ethyl)-aziridine, bis isosebacoyl-1-aziridine, tri-[-1-(2-methyl)-aziridine] phosphine oxide, bis-[1-(2-methyl)-aziridinyl] ethyl sulfone, polyfunctional aziridines sold under the trade designations PFAZ300, PFAZ301 by Ionac Chemical Company, and the like. It will also be apparent that in addition to the carbon black illustrated herein as being optionally employed as a filler other materials will be suitable for use as fillers and may also optionally be employed singly or in combination with each other or with carbon black. Illustrative of these are: titanium dioxide, silicon dioxide, silica, aluminum oxide, milled glass, and alumino silicate clays.

The aziridines of the invention may be incorporated at from about 1 to 10% by weight of the total weight of the liner mix. Preferably they may be incorporated at from about 4 to 8%, conveniently about 6% by weight of the total.

The following example further illustrates the best mode contemplated by the inventors for the practice of their invention.

EXAMPLE

The following Example illustrates the preparation of a typical liner composition using the adhesion enhancers of the invention.

To R-45M (41.85 weight %) is added DDI (12.15 weight %) trimesoyl-1-(2-ethyl)-aziridine (6.0 weight %) and carbon black (40.0 weight %), the aziridine being melted prior to addition and the entire mixture blended for about 45 minutes and then degassed by conventional techniques such as vacuum mixing or slit deaeration. The mix is then cast by standard procedures and cured at 170° F. for 96 to 168 hours. The normal thickness obtained in one application to a motor casing is from 1/32 to 1/16 inch.

Typical physical properties obtained from cured samples of the mix are as follows:

| Tensile Strength (ASTM D 412) | | | | |
|---|---|---|---|---|
| | Test Temp. (°F.) | | | |
| | 0 | 77 | 150 | 200 |
| Stress, Ultimate (psi) | 1,043 | 543 | 331 | 258 |
| Strain, Ultimate (%) | 464 | 431 | 324 | 282 |
| Stress-100% Strain (psi) | — | 118 | — | — |
| Stress-300% Strain (psi) | — | 379 | — | — |
| Stress-500% Strain (psi) | — | 509 | — | — |
| Tear Strength, pli | — | 111 | — | — |
| Hardness (Shore A at Ambient Temperature) | | 52 | | |

| | Ageing Properties (Test at 77° F.) | | | |
|---|---|---|---|---|
| Ageing Time | Ageing Temperature 130° F. | | Ageing Temperature 170° F. | |
| (Weeks) | Ult. Stress | Ult. Strain | Ult. Stress | Ult. Strain |
| 0 | 501 | 389 | 501 | 389 |
| 2 | 513 | 325 | 781 | 146 |
| 4 | 548 | 339 | 847 | 121 |
| 8 | 630 | 267 | 878 | 136 |
| 12 | 589 | 194 | 861 | 136 |

Typical Bond Properties

Samples of the above mix were cured on steel surfaces, grit blasted and vapor degreased, or were cured and typical propellant and insulation material formulations cured on the liner surface. Tensile adhesion and peel strengths were then determined with the results shown which may be compared to 6-9 pli peel strength, with thin coat of propellant failure, for the bond at ambient temperature (77° F.) between similar propellant and liner formulations without aziridine where the liner is not fully cured prior to cure of propellants, and 3-6 pli where the liner is fully cured prior to propellant addition.

| Adjacent Material | Test Temp. (°F.) | Tensile Adhesion (pli) | | Peel (pli) | | |
|---|---|---|---|---|---|---|
| | | Load | Type of Failure | Initial | Average | Type of Failure |
| Steel | −65 | 1,333 | 2-Liner 1-Plate Beat | 7197.3 | — | 3-Tab Broke |
| Steel | 77 | 249.3 | 3-Liner | 43.0 | 35.7 | 3-Thin Coat Liner |
| Steel | 165 | 184.7 | 3-Thin Coat Liner | 13.8 | 16.0 | 3-Thin Coat Liner |
| Steel | 200 | 170.7 | 3-Thin Coat Liner | 27.3 | 15.7 | 3-Thin Coat Liner |
| Steel | 250 | 160.0 | 3-Liner | 25.5 | 14.5 | 2-Liner Pulled from Shim 1-Thin Coat Liner |
| Steel | 300 | 117.7 | 3-Liner | 17.6 | 10.6 | 3-Liner Pulled from Shim |
| Asbestos filled Polyisoprene Rubber Based Insulation | −65 | 1,586 | 2-Thin Coat of Liner 1-insulation | 75.5 | 105.0 | 2-insulation 1-Thin Coat of Liner |
| Asbestos filled Polyisoprene Rubber Based Insulation | 77 | 163.0 | 3-Thin Coat of Liner | 14.0 | 16.1 | 5-Bond |
| Asbestos filled Polyisoprene Rubber Based Insulation | 165 | 103.0 | 3-Thin Coat of Liner | 4.0 | 9.1 | 3-Thin Coat of Liner |
| Asbestos filled Polyisoprene Rubber Based Insulation | 200 | 107.5 | 2-Thin Coat of Liner | 4.4 | 7.4 | 3-Thin Coat of Liner |
| Asbestos filled Polyisoprene Rubber Based Insulation | 250 | 126.3 | 3-Thin Coat of Liner | 12.4 | 12.4 | 2-Thin Coats of Liner-1-Thin Coat of Liner, and Liner pulled from Shim |
| Asbestos filled Polyisoprene Rubber Based Insulation | 300 | 129.0 | 2-Thin Coat of Liner-1-Liner | 12.7 | 11.1 | 2-Thin Coat of Liner 1-Liner pulled from Shim |
| R45M Based Ammonium Perchlorate Oxidizer Isophorone diisocyanate cured propellant** | −65 | 808 | 2-Thin Coat Propellant 1-Thin Coat Propellant & Liner | 75.0 | 49.7 | 3-Thin Coat Propellant |
| R45M Based Ammonium Perchlorate Oxidizer Isophorone diisocyanate cured propellant** | 77 | 176 | 3-Propellant | 24.5 | 46.1 | 3-Liner |
| R45M Based Ammonium Perchlorate Oxidizer Isophorone diisocyanate cured propellant** | 165 | 114 | 3-Propellant | 25.4 | 27.7 | 2-Liner + Propellant 1-Liner |

**Liner precured 24 hours at 145° F.

| | Typical bond properties on ageing were also determined-Tests were run at 77° F. | | | | | | |
|---|---|---|---|---|---|---|---|
| | Storage | | Tensile Adhesion (pli) | | Peel (pli) | | |
| Adjacent Material | Time (Weeks) | Temp. (°F.) | Load | Failure | Initial | Average | Failure |
| R-45M Based Propellant Containing Ammonium Perchlorate Oxidizer Cured with DDI, Liner Precured 32 Hours at 145° F. | 0 | 111 | 174.7 | 5-Propellant | 29.6 | 32.5 | 5-Propellant and Liner |

-continued

Typical bond properties on ageing were also determined-Tests were run at 77° F.

| Adjacent Material | Storage Time (Weeks) | Storage Temp (°F.) | Tensile Adhesion (pli) Load | Tensile Adhesion Failure | Peel (pli) Initial | Peel (pli) Average | Failure |
|---|---|---|---|---|---|---|---|
| R-45M Based Propellant Containing Ammonium Perchlorate Oxidizer Cured with DDI, Liner Precured 32 Hours at 145° F. | 2 | 130 | 215.7 | 5-Propellant | 24.7 | 31.1 | 5-Propellant |
| R-45M Based Propellant Containing Ammonium Perchlorate Oxidizer Cured with DDI, Liner Precured 32 Hours at 145° F. | 2 | 170 | 184.5 | 5-Propellant | 20.8 | — | 3-Liner pulled from Shim-2-Liner + Propellant |
| R-45M Based Propellant Containing Ammonium Perchlorate Oxidizer Cured with DDI, Liner Precured 32 Hours at 145° F. | 4 | 130 | 217.7 | 5-Propellant | 28.9 | 30.9 | 5-Propellant and liner |
| R-45M Based Propellant Containing Ammonium Perchlorate Oxidizer Cured with DDI, Liner Precured 32 Hours at 145° F. | 4 | 170 | 178.9 | 5-Propellant | 21.0 | — | 3-Liner Pulled from Shim-2-Liner + Propellant |
| R-45M Based Propellant Containing Ammonium Perchlorate Oxidizer Cured with DDI, Liner Precured 32 Hours at 145° F. | 8 | 130 | 225.9 | 5-Propellant | 24.4 | 27.2 | 4-Propellant + Their Coat Liner 1-Liner pulled from Shim |
| R-45M Based Propellant Containing Ammonium Perchlorate Oxidizer Cured with DDI, Liner Precured 32 Hours at 145° F. | 8 | 170 | 153.5 | 5-Propellant | 16.0 | 9.2 | 4-Propellant 1-Liner pulled from Shim |
| R-45M Based Propellant Containing Ammonium Perchlorate Oxidizer Cured with DDI, Liner Precured 32 Hours at 145° F. | 12 | 130 | 228.8 | 5-Propellant | 24.9 | — | 5-Liner pulled from Shim |
| R-45M Based Propellant Containing Ammonium Perchlorate Oxidizer Cured with DDI, Liner Precured 32 Hours at 145° F. | 12 | 170 | 155.8 | 5-Propellant | 14.5 | — | 4-Liner pulled from Shim 1-Propellant |

The subject matter which applicants regard as their invention is particularly pointed out and distinctly claimed as follows:

1. A process for case bonding a hydroxy terminated polybutadiene based polyurethane bound solid propellant grain to a rocket motor casing which comprises:
   (a) providing a rocket motor casing to which it is desired to case bond said solid propellant grain with a cured liner comprising an aziridine and a hydroxy terminated polybutadiene cured with a polyisocyanate curing agent;
   (b) casting said hydroxy terminated polybutadiene based propellant grain, in an uncured form, into the desired configuration in said rocket motor; and
   (c) curing said propellant grain.

2. The process of claim 1, wherein: said cured liner contains from about 1% to 10% of said aziridine.

3. An improved case bonded solid propellant rocket motor having a casing liner and containing a hydroxy terminated polybutadiene based polyurethane bound propellant grain wherein the casing liner for said propellant is based on a hydroxy terminated polybutadiene and wherein the improvement comprises having a precured casing liner having incorporated therein an aziridine into (the) said precured casing liner of said rocket motor.

4. A case bonded solid propellant rocket motor wherein said motor contains a bonded casing liner consisting essentially of hydroxy terminated polybutadiene and from about 1% to 10% of aziridine.

* * * * *